United States Patent
D'Angelo et al.

(10) Patent No.: US 9,128,800 B2
(45) Date of Patent: Sep. 8, 2015

(54) PERSONALIZED PLATFORM FOR ACCESSING INTERNET APPLICATIONS

(75) Inventors: Adam D'Angelo, Mountain View, CA (US); Dave Fetterman, San Francisco, CA (US); Charlie Cheever, Palo Alto, CA (US); Ari Steinberg, Menlo Park, CA (US); Eric Zamore, Palo Alto, CA (US); James Wang, San Francisco, CA (US); Julie Zhuo, Palo Alto, CA (US); Dave Morin, San Francisco, CA (US); Mark Slee, San Francisco, CA (US); Ruchi Sanghvi, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 1165 days.

(21) Appl. No.: 12/154,504

(22) Filed: May 23, 2008

(65) Prior Publication Data

US 2009/0031301 A1    Jan. 29, 2009

Related U.S. Application Data

(60) Provisional application No. 60/931,847, filed on May 24, 2007.

(51) Int. Cl.
    *G06F 9/44*      (2006.01)
    *G06F 9/445*      (2006.01)
    *G06Q 10/10*      (2012.01)
    (Continued)

(52) U.S. Cl.
CPC .. *G06F 8/70* (2013.01); *G06F 8/60* (2013.01); *G06Q 10/10* (2013.01); *H04L 63/102* (2013.01); *H04L 67/306* (2013.01); *H04L 67/34* (2013.01)

(58) Field of Classification Search
CPC ................ G06F 8/60; G06F 8/61; G06F 8/63
USPC ....... 717/101–178; 726/29; 705/319; 706/16; 709/203–205
See application file for complete search history.

(56) References Cited

U.S. PATENT DOCUMENTS

| | | | |
|---|---|---|---|
| 5,796,967 A | 8/1998 | Filepp et al. | |
| 5,937,413 A | 8/1999 | Hyun | |
| 6,021,437 A * | 2/2000 | Chen et al. | 709/224 |

(Continued)

FOREIGN PATENT DOCUMENTS

WO    WO 2007/052285 A2    5/2007

OTHER PUBLICATIONS

PCT International Search Report and Written Opinion, PCT/US2008/06646, Jul. 23, 2008.

(Continued)

*Primary Examiner* — Lewis A Bullock, Jr.
*Assistant Examiner* — Francisco Aponte
(74) *Attorney, Agent, or Firm* — Fenwick & West LLP

(57) ABSTRACT

The present invention provides a system and method for providing a personalized platform for accessing internet applications. According to one embodiment of the invention, a social network provider receives a request for installation of an application from a user of the social network, installs the application at multiple points in the user's social network environment, and personalizes interfaces with the application at these integration points based on information about the user available from the social network. The present invention enables applications to be integrated in the social network environment at multiple integration points and to be personalized for and configured by the user.

21 Claims, 19 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 6,029,141 A | 2/2000 | Bezos | |
| 6,367,035 B1* | 4/2002 | White | 714/40 |
| 6,629,267 B1* | 9/2003 | Glerum et al. | 714/38.11 |
| 7,013,292 B1 | 3/2006 | Hsu | |
| 7,072,807 B2* | 7/2006 | Brown et al. | 703/1 |
| 7,249,123 B2 | 7/2007 | Elder | |
| 7,269,590 B2* | 9/2007 | Hull et al. | 707/770 |
| 7,721,158 B2* | 5/2010 | Lee | 714/48 |
| 7,761,393 B2* | 7/2010 | Macbeth et al. | 706/16 |
| 7,913,249 B1* | 3/2011 | MacIntyre et al. | 717/174 |
| 8,136,090 B2* | 3/2012 | Boss et al. | 717/121 |
| 8,425,331 B2* | 4/2013 | Bortnik et al. | 463/43 |
| 8,516,476 B2* | 8/2013 | Chen et al. | 717/176 |
| 2001/0037721 A1 | 11/2001 | Hasegawa | |
| 2002/0059201 A1* | 5/2002 | Work | 707/3 |
| 2003/0037327 A1* | 2/2003 | Cicciarelli et al. | 717/178 |
| 2003/0145093 A1 | 7/2003 | Oren | |
| 2003/0149889 A1* | 8/2003 | Wookey et al. | 713/200 |
| 2003/0208685 A1* | 11/2003 | Abdel-Rahman | 713/191 |
| 2003/0222918 A1 | 12/2003 | Coulthard | |
| 2003/0225632 A1 | 12/2003 | Tong | |
| 2004/0024846 A1 | 2/2004 | Randall | |
| 2004/0024849 A1* | 2/2004 | El-Beik | 709/219 |
| 2004/0088177 A1 | 5/2004 | Travis | |
| 2004/0128583 A1* | 7/2004 | Iulo et al. | 714/25 |
| 2004/0148275 A1 | 7/2004 | Achlioptas | |
| 2004/0237068 A1* | 11/2004 | Ren | 717/110 |
| 2005/0021750 A1 | 1/2005 | Abrams | |
| 2005/0050539 A1* | 3/2005 | Burkhardt et al. | 717/174 |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0193054 A1* | 9/2005 | Wilson et al. | 709/200 |
| 2005/0197846 A1 | 9/2005 | Pezaris | |
| 2005/0198020 A1 | 9/2005 | Garland | |
| 2005/0198031 A1 | 9/2005 | Pezaris | |
| 2005/0198305 A1 | 9/2005 | Pezaris | |
| 2005/0203807 A1 | 9/2005 | Bezos | |
| 2005/0210409 A1* | 9/2005 | Jou | 715/811 |
| 2005/0216300 A1* | 9/2005 | Appelman et al. | 705/1 |
| 2005/0216550 A1 | 9/2005 | Paseman | |
| 2005/0235062 A1 | 10/2005 | Lunt | |
| 2005/0256756 A1 | 11/2005 | Lam | |
| 2005/0257214 A1* | 11/2005 | Moshir et al. | 717/171 |
| 2005/0262495 A1* | 11/2005 | Fung et al. | 717/170 |
| 2006/0041543 A1 | 2/2006 | Achlioptas | |
| 2006/0042483 A1 | 3/2006 | Work | |
| 2006/0048059 A1 | 3/2006 | Etkin | |
| 2006/0052091 A1 | 3/2006 | Onyon | |
| 2006/0080456 A1* | 4/2006 | Hur et al. | 709/231 |
| 2006/0080613 A1 | 4/2006 | Savant | |
| 2006/0085259 A1* | 4/2006 | Nicholas et al. | 705/14 |
| 2006/0085419 A1 | 4/2006 | Rosen | |
| 2006/0136419 A1 | 6/2006 | Brydon | |
| 2006/0143183 A1 | 6/2006 | Goldberg | |
| 2006/0161599 A1 | 7/2006 | Rosen | |
| 2006/0184617 A1 | 8/2006 | Nicholas | |
| 2006/0190281 A1 | 8/2006 | Kott | |
| 2006/0194186 A1 | 8/2006 | Nanda | |
| 2006/0218225 A1 | 9/2006 | Hee Voon | |
| 2006/0224675 A1* | 10/2006 | Fox et al. | 709/206 |
| 2006/0229063 A1 | 10/2006 | Koch | |
| 2006/0230061 A1 | 10/2006 | Sample | |
| 2006/0230175 A1* | 10/2006 | de Vries | 709/231 |
| 2006/0247940 A1 | 11/2006 | Zhu | |
| 2006/0248573 A1 | 11/2006 | Pannu | |
| 2006/0256008 A1 | 11/2006 | Rosenberg | |
| 2006/0265227 A1 | 11/2006 | Sadamura | |
| 2006/0271341 A1* | 11/2006 | Brown et al. | 703/1 |
| 2006/0293976 A1 | 12/2006 | Nam | |
| 2007/0030824 A1* | 2/2007 | Ribaudo et al. | 370/328 |
| 2007/0043720 A1* | 2/2007 | Koenig et al. | 707/6 |
| 2007/0072678 A1* | 3/2007 | Dagres | 463/42 |
| 2007/0106627 A1 | 5/2007 | Srivastava et al. | |
| 2007/0124721 A1* | 5/2007 | Cowing et al. | 717/100 |
| 2007/0174389 A1 | 7/2007 | Armstrong | |
| 2007/0208916 A1 | 9/2007 | Tomita | |
| 2007/0282987 A1 | 12/2007 | Fischer | |
| 2007/0294669 A1* | 12/2007 | Robalewski et al. | 717/120 |
| 2007/0297590 A1* | 12/2007 | Macbeth et al. | 379/201.02 |
| 2008/0005076 A1 | 1/2008 | Payne | |
| 2008/0005735 A1* | 1/2008 | Curtis | 717/174 |
| 2008/0010343 A1 | 1/2008 | Escaffi | |
| 2008/0028390 A1* | 1/2008 | Fors et al. | 717/174 |
| 2008/0033776 A1 | 2/2008 | Marchese | |
| 2008/0040428 A1 | 2/2008 | Wei | |
| 2008/0070697 A1 | 3/2008 | Robinson | |
| 2008/0086458 A1 | 4/2008 | Robinson | |
| 2008/0155534 A1* | 6/2008 | Boss et al. | 717/178 |
| 2008/0168437 A1* | 7/2008 | Chen et al. | 717/176 |
| 2008/0178298 A1* | 7/2008 | Arai et al. | 726/29 |
| 2008/0201707 A1* | 8/2008 | Lavery et al. | 717/178 |
| 2008/0222199 A1* | 9/2008 | Tiu et al. | 707/104.1 |
| 2008/0288582 A1* | 11/2008 | Pousti et al. | 709/203 |

OTHER PUBLICATIONS

Flores, Fernando et al. "Computer systems and the design of organizational interaction." In ACM Transactions on Information Systems (TOIS), vol. 6, Issue 2, Apr. 1988.

ChipIn. ChipIn: The easy way to collect money [online], Dec. 15, 2006 http://web.archive.org/web/20061215090739/www.chipin.com/overview.

Parzek, E. Social Networking to ChipIn to a Good Cause [online]. Business Design Studio, Jun. 29, 2006 http://www.businessdesignstudio.com/resources/blogger/2006/06social-networking-tochipin-to-good.html.

* cited by examiner

PERSONALIZED PLATFORM FOR ACCESSING INTERNET APPLICATIONS

CROSS-REFERENCE TO RELATED APPLICATIONS

This application claims the benefit and priority of U.S. Provisional Patent Application Ser. No. 60/931,847, titled, "Personalized Platform for Accessing Internet Applications," which is incorporated by reference herein. This application is related to copending U.S. patent application Ser. No. 11/493,291, titled "Systems and Methods for Dynamically Generating a Privacy Summary," filed on Jul. 25, 2006, which is incorporated by reference herein.

BACKGROUND OF THE INVENTION

1. Field of the Invention

This invention relates to internet applications, and particularly to accessing applications available over the internet through an internet-based social network.

2. Description of Related Art

Applications currently available over the internet are typically accessed by individual computer users on servers. Recently, "widgets" have been made available to allow information from a social network to be used by a third-party application available to a user who is also using the social network. A "widget" is a single access point in the user's social network, connecting the user and the application. The user's interface with the application is not personalized to the user.

The prior art does not provide a platform from which a user of a computing device in an internet-based social network may access one or more applications available over the internet, in which the user's interaction with the application is personalized based on information about the user that is available from the social network. It is also desirable for the social network to provide more than a single access point connecting the user and the application, so that the features of the application may be more fully integrated into the user's experience of the social network.

SUMMARY OF THE INVENTION

The present invention provides a system and method for providing a personalized platform for accessing internet applications. According to one embodiment of the invention, a social network provider receives a request for installation of an application from a user of the social network, installs the application at multiple points in the user's social network environment, and personalizes interfaces with the application at these integration points based on information about the user available from the social network. The present invention enables applications to be integrated in the social network environment at multiple integration points and to be personalized for and configured by the user.

DETAILED DESCRIPTION OF THE INVENTION

The present invention provides a platform from which a user of a computing device accessing an internet-based social network, such as the Facebook, may interface with one or more applications available over the internet, in which the user's interaction with the application is personalized based on information about the user that is available from the social network. The platform provides multiple integration points connecting the user's social network environment with the application, so that the features of the application are fully integrated into the user's experience of the social network.

Figure 1:
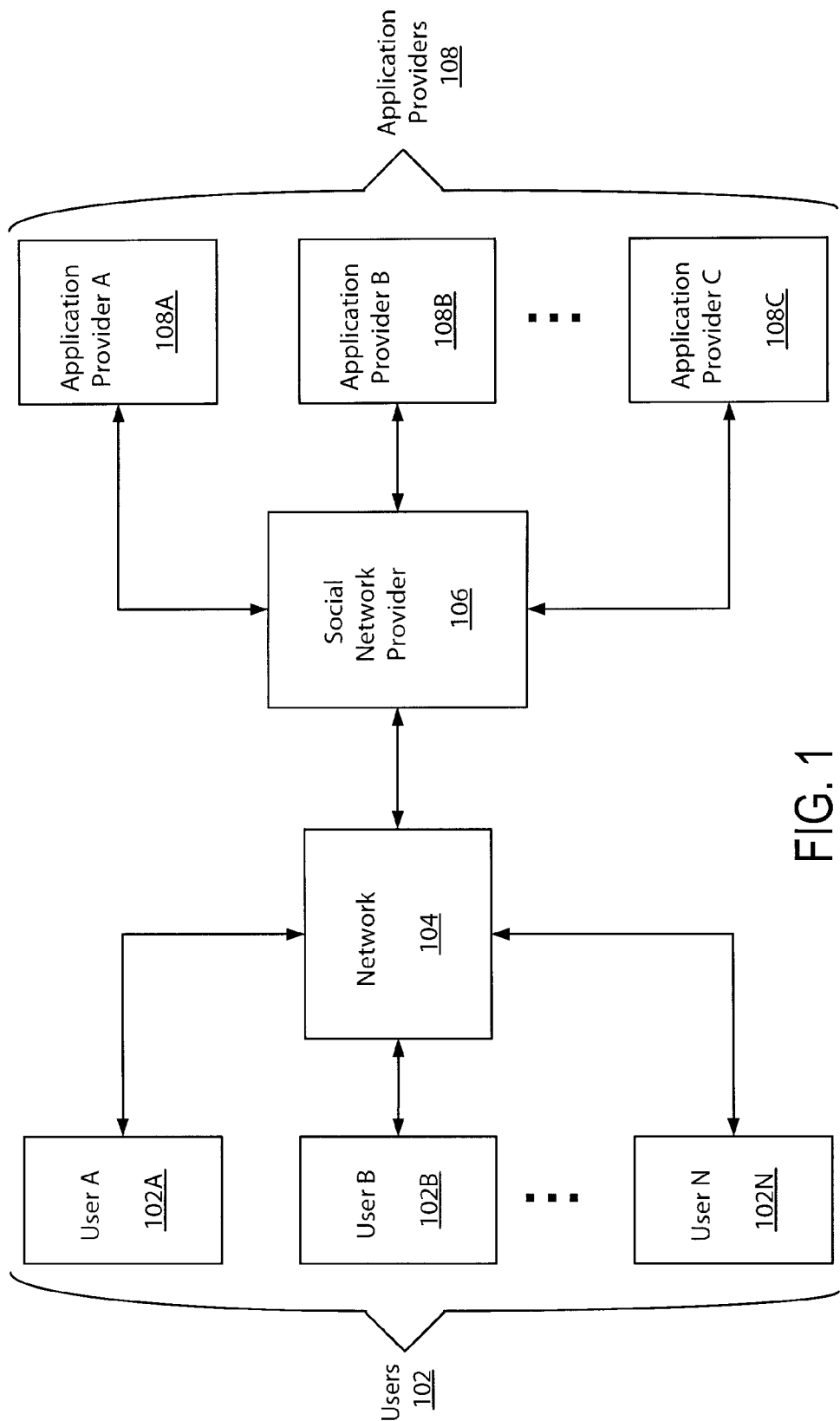
FIG. 1 is a block diagram of an exemplary architecture that provides personalized interaction with internet applications through a social network provider.

FIG. 1 is a block diagram of an exemplary architecture that provides personalized interaction with internet applications through a social network provider. The architecture providing personalized interaction may also be called a "platform." Users 102A-102N communicate over a network 104 with a social network provider 106. The users 102A-102N may use any type of computing device, such as a cellular telephone, a personal digital assistant, and/or a desktop or a laptop computer.

The social network provider 106 may comprise any provider of social networking services, such as communication services and/or dating services. For example, a user 102A may communicate with another user 102B via a social networking website associated with the social network provider 106. The social network provider may offer the user an opportunity to connect or reconnect with one or more other users 102B-102N that attended, for example, the same university as the user 102A.

One or more application providers 108 are coupled to the social network provider 106. The application provider 108 may receive a request for an application from a user 102A via the social network provider 106. Through the social network provider 106, the application provider 108 may integrate an application into the social network environment experienced by a user 102A, for example, by providing interfaces with the application on a profile associated with the user 102A. Once an application is installed in the social network environment of a user 102A, the application provider 108 may generate one or more sets of privacy settings selections, which govern what information about the user 102A may be accessed by an applications installed by the user 102A, or by one or more other users 102B-102N, as described in copending U.S. patent application Ser. No. 11/493,291, titled "Systems and Methods for Dynamically Generating a Privacy Summary," filed on Jul. 25, 2006. According to exemplary embodiments, one or more applications may be installed by each user 102. Each user 102 may select different privacy settings for different applications.

Figure 2:
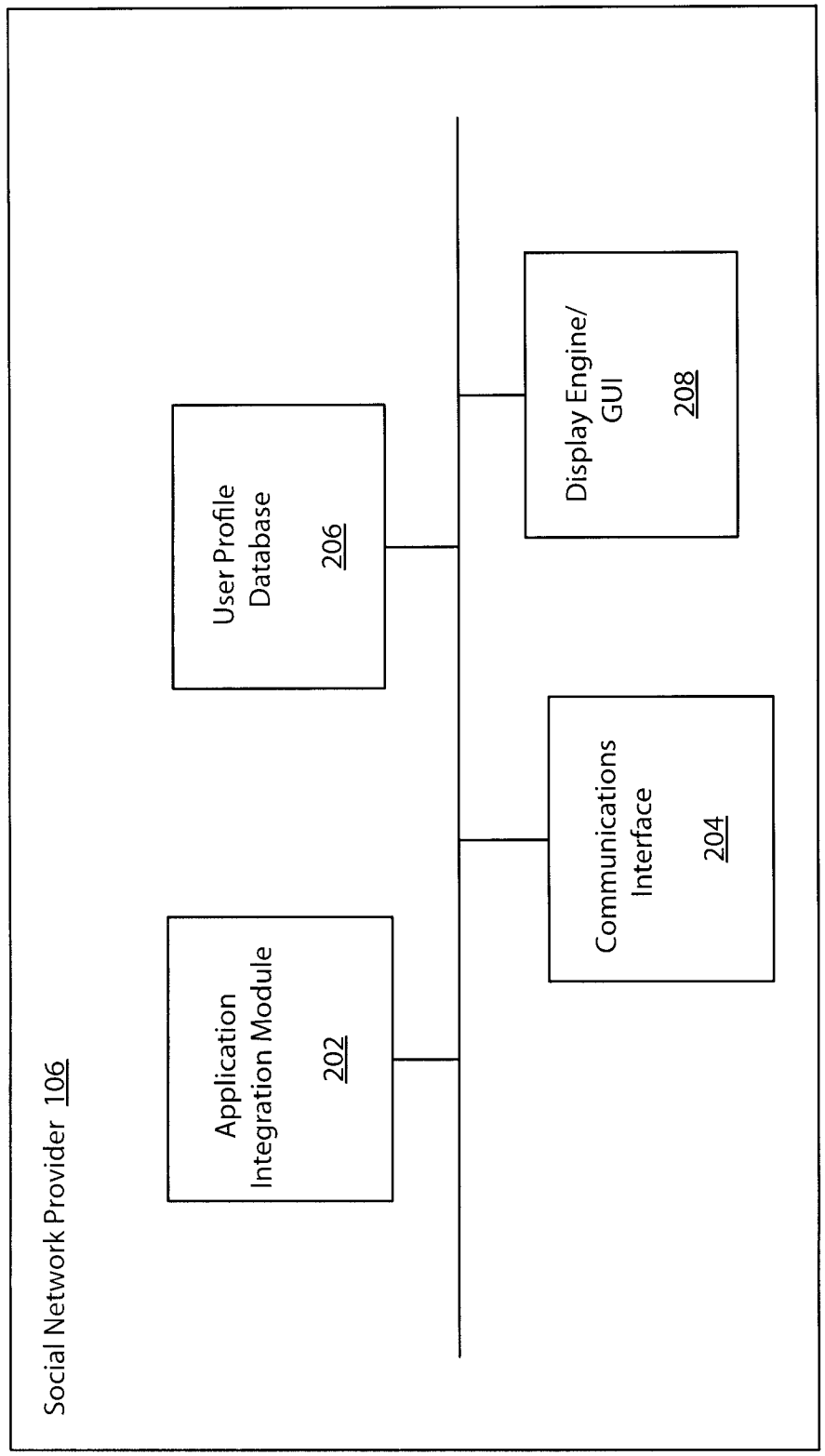
FIG. 2 is a block diagram of an exemplary social network provider.

FIG. 2 is a block diagram of an exemplary social network provider. The social network provider 106 may comprise a server, a client device, or any other device. The social network provider 106 includes an application integration module 202 for integrating an installed application into the social network environment experienced by user 102A, as discussed herein. For example, the application integration module 202 may integrate the application into various parts of the profile for the user 102A.

The social network provider 106 includes a communications interface 204 for communicating with the users 102 over the network 104. The users 102 may communicate various types of information, such as requests to install or uninstall an application and the privacy settings selections associated with an application, to the social network provider 106 via the communications interface 204.

A user profile database 206 is provided for storing data associated with each of the users, comprising data accessible by an application, for example, via integration points established by the application integration module 202. When a user 102A selects the privacy settings to associate with an application installed by himself or by one or more users 102B-102N, the user profile database 206 updates the user data associated with user 102A. Accordingly, the privacy settings selections are stored in association with each user 102. The privacy settings selections and other user 102 information may be stored, modified, added, or otherwise embodied or captured in any storage medium, according to some embodiments, again as described in U.S. patent application Ser. No. 11/493,291, titled "Systems and Methods for Dynamically Generating a Privacy Summary," filed on Jul. 25, 2006.

A display engine/GUI 208 may also be provided by the social network provider 106. The display engine/GUI 208 displays information, such as user profiles, application interfaces, and privacy settings selections to the users 102. The users 102 may interact with the social network provider 106 via the display engine/GUI 208. For example, a user 102A may perform such actions as accessing the user's own profile, accessing other users' information available via the social network provider, interfacing with an installed application, and selecting privacy settings via the display engine/GUI 208.

Any grouping of users 102A-102N may be provided by the social network provider 106. In other words, a social group may comprise users grouped according to any type of category, such as friends and fellow alumni. The user may specify the groupings, and/or the groupings may be predetermined by the social network provider 106.

Although the social network provider 106 is described as being comprised of various components (such as the communications interface 204, the user profile database 206, and the display engine/GUI 208), fewer or more components may comprise the social network provider 106 and still fall within the scope of various embodiments. Also, any computing device or interface falls within the scope of various embodiments.

Figure 3:
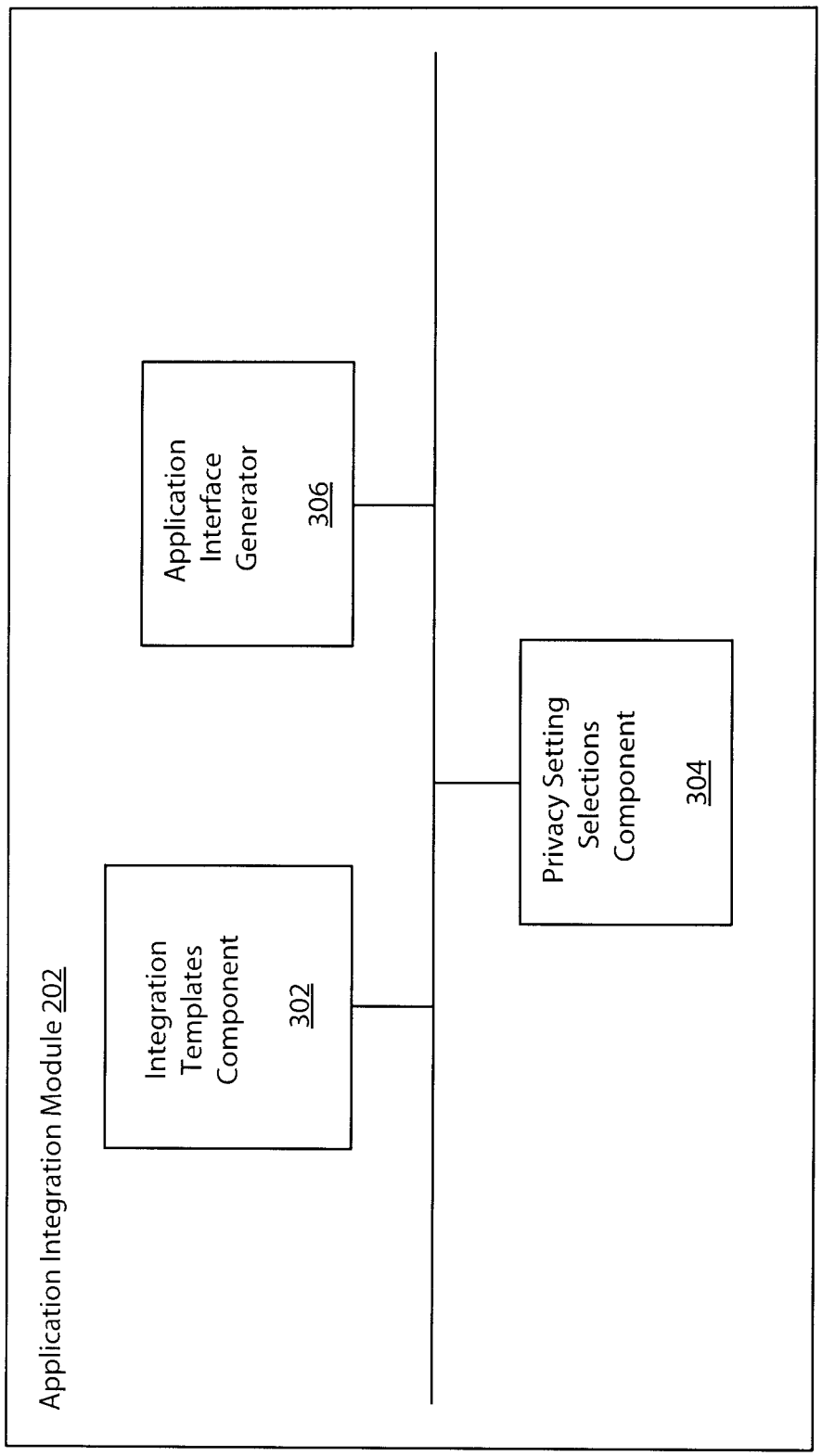
FIG. 3 is a block diagram of an exemplary application integration module.

FIG. 3 is a block diagram of an exemplary application integration module 202. An integration templates component 302 provides presentation templates for use at one or more integration points in the social network environment, such as one or more integration points in the profile associated with a user 102. For example, an integration templates component 302 may provide a template for display at an interface with an installed application in the left column of a user's profile. The location of the interface may be configurable by a user 102 and/or by the social network provider 106. For example, a box in the left column of the user's profile that provides an interface integrating the application with the user's profile may be moved up and down within the left column. Alternatively, such a box may be moved to the right column of the profile. The application interfaces at exemplary integration points are discussed further in connection with FIG. 10 below. Any number of integration points and associated application integration templates may be provided.

A privacy setting selections component 304 receives the privacy settings selections from the user. For example, user 102A selects from various options related to privacy for one or more applications. The application interfaces at these exemplary integration points are discussed further in connection with FIG. 15 and FIG. 16 below. In some embodiments the privacy setting selections component 304 updates the user profile database 206 with the privacy settings selected by the user.

An application interface generator 306 utilizes the integration templates from the integration templates component 302 to create an entire application integration point. According to some embodiments, the integration templates component 302 comprises a database or other storage medium that stores the integration templates, which the application interface generator 306 accesses in order to generate the integration point.

In exemplary embodiments, the application interface generator 306 may modify the integration templates in order to customize the application interface. For instance, the application interface generator 306 may insert the word "you" into the display at the application integration point, in order to customize the application interface for the particular user to whom the application interface is being displayed. In another example, the application interface generator 306 may modify the appearance of the time in the display at the application integration point, to conform the application interface to the time zone of the user viewing the display. These exemplary aspects of personalizing an application interface at an integration point are discussed further in connection with FIG. 7 below.

The application interface generator 306 may then forward the application interface to the display engine/GUI 208 for display to the user 102. The application interfaces at various exemplary integration points, as discussed in further detail below.

Figure 4:
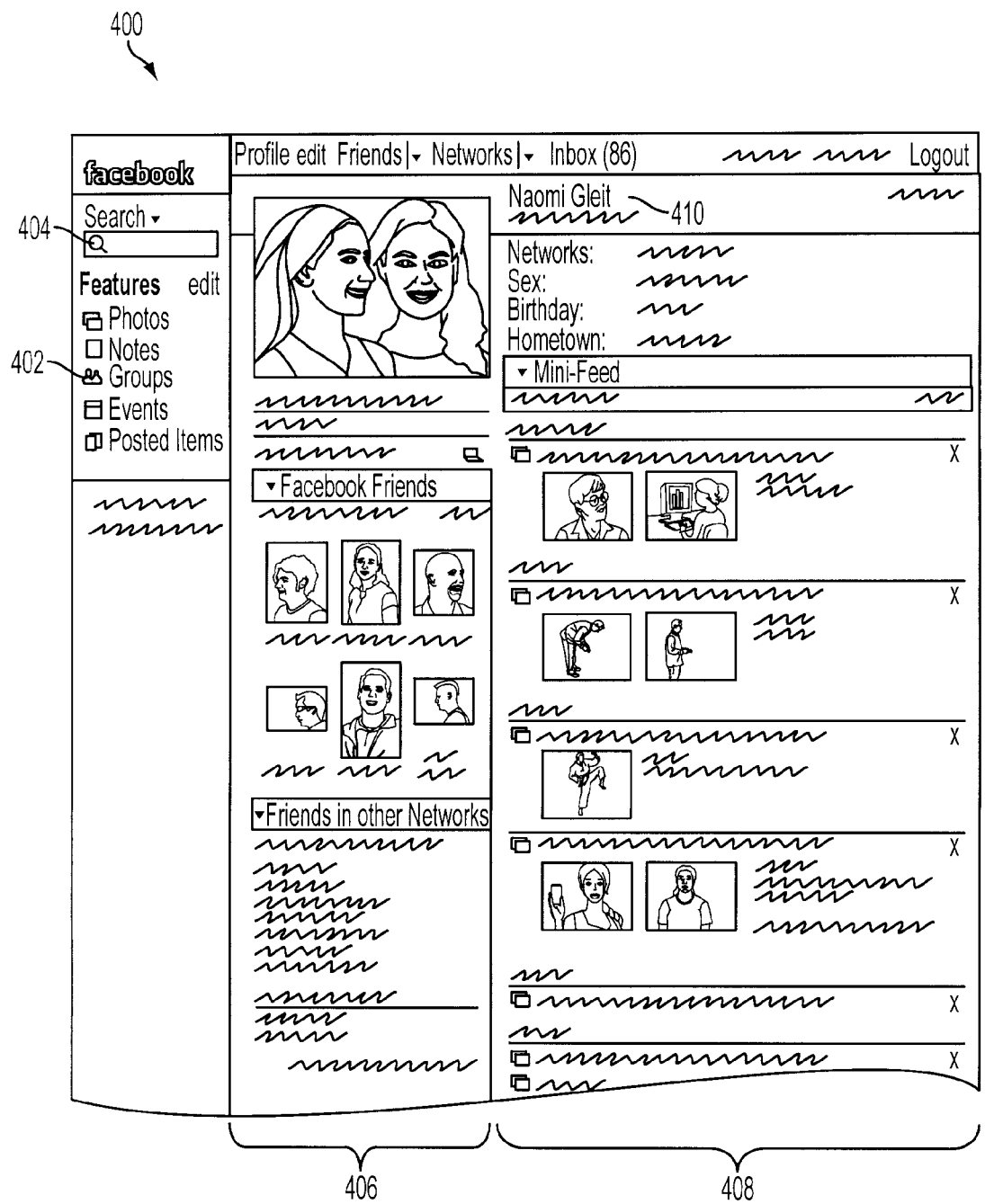
FIG. 4 is a screenshot of an exemplary user profile on a social network.

FIG. 4 is a screenshot of an exemplary user profile 400 on a social network. The profile 400 is a presentation page, the content of which is editable and configurable by, for example, user 102A and viewable by other users of the social network. In some embodiments, other users may also edit aspects of user 102A's profile 400. In this example, a navigation bar 402 is shown beneath a search box 404 in the upper left corner of the profile 400. Immediately to the right of the navigation bar 402 is the left column 406 of the profile 400, in this case headed by a photograph including the user. Immediately to the right of the left column is the right column 408 of the profile 400, here, headed by the user's name 410 ("Naomi Gleit").

Figure 5:
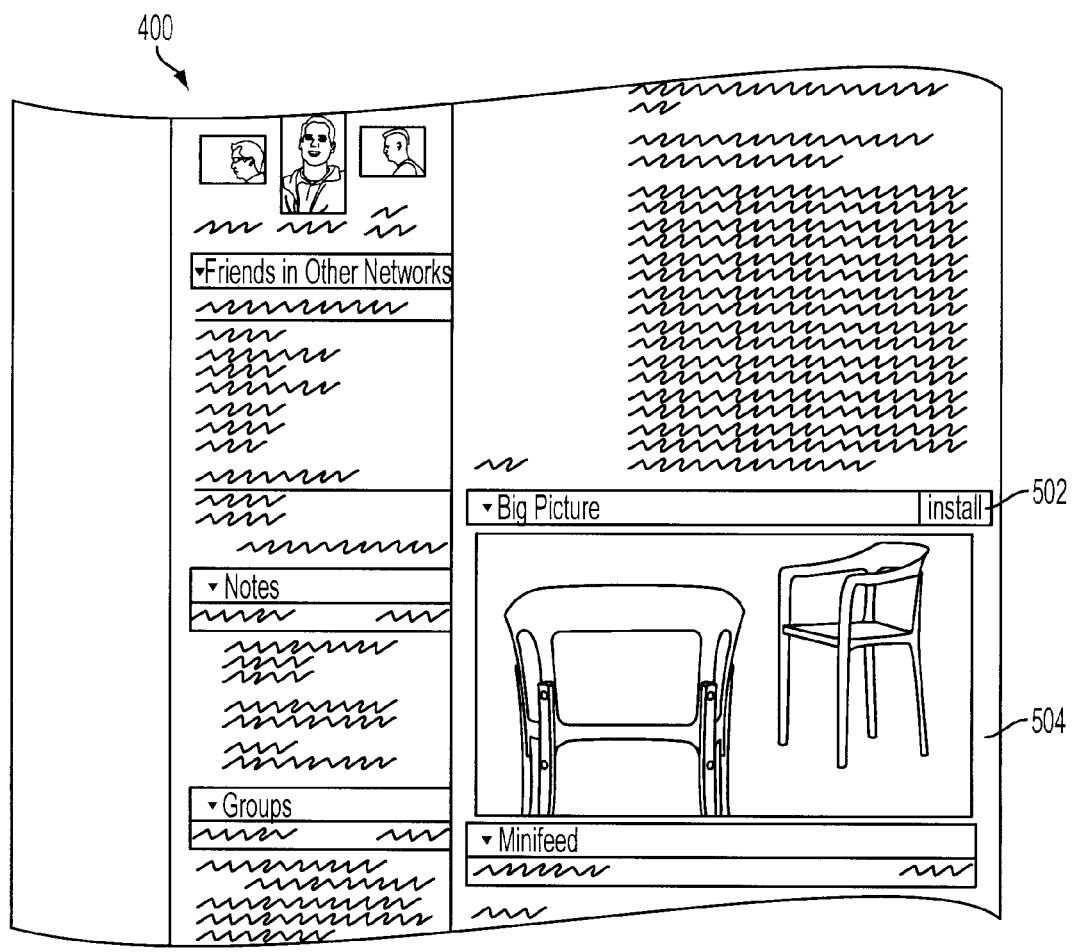
FIG. 5 is a screenshot of an exemplary portion of a user profile, including a link allowing a user to install an application.

FIG. 5 is a screenshot of an exemplary portion of a user profile 400, including a link 502 allowing a user to install an application. An application may be any application, including applications providing text, images, sounds, or sequences thereof (such as music and/or video). In this example, the user has the option of installing the third-party application, "Big Picture," on his profile 400, and may do so by clicking the "install" button 502 in the box 504 titled, "Big Picture."

Figure 6:
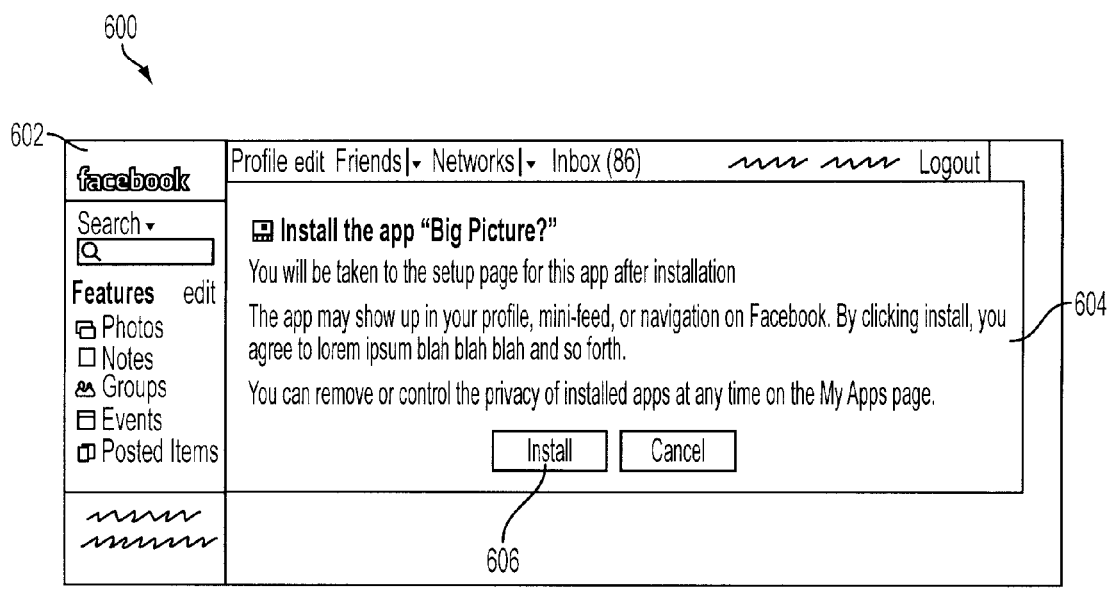
FIG. 6 is a screenshot of an exemplary interface for confirming installation of the application in the user social network environment.

FIG. 6 is a screenshot of an exemplary interface 600 for confirming installation of the application in the user social network environment. The interface is framed by a "dashboard" 602, which identifies the social network. Here, the interface 600 comprises a box 604 that includes a button 606 which, if clicked upon, will install the application in the user's social network environment. The box 604 appears after the user has clicked the "install" button 502 shown in FIG. 5, and effectively allows confirmation that the user intends to install the application.

Installation need not entail the user's downloading the application onto his computing device. In some embodiments, installation enables the user to interact directly with the application, while the application itself remains on another device. Installation may also allow the application to access information about the user that is available through the social network platform. The user's accessing the application via the social network platform may result in a tailored interaction between the user and the application, even if the application is provided by a third party (i.e., neither the user nor the social network provider). For example, the application might access information about the user's "friends," i.e., other users of the social network identified by the user to the social network provider, as well as information about the user.

In one exemplary embodiment, a user may choose to install an application called, for example, "My Favorite Restaurants." Installation may allow the My Favorite Restaurants software access to information about the membership of groups of users of the social network with which the user is affiliated, subject to the privacy limitations set by the users.

For example, a box might appear on the user's profile listing his favorite restaurants, along with a link that might take the user to a list of his friends' favorite restaurants. Such personalized interactions may be programmed in an appropriate language. One such language unique to Facebook is known as, "Facebook Markup Language," or "FBML."

FBML is a markup language for describing web content in a social context, which enables a programmer to provide personalized screens to users of a social network. While the widely used markup language, HTML, presents the same information for every user, FBML renders information differently for different users. For example, information can be displayed or not displayed to a user 102A based on the user's privacy settings and on whether the user has added a particular application to his or her profile. Presented content may also be tailored for given users by being displayed in different languages for different users. Further examples include tailoring a display for a user by writing "you" instead of the user's name, and customizing the way time is displayed to a particular user, such as by displaying it in terms of the user's time zone.

Another advantage afforded by a markup language such as FBML is that it can be rendered safely in many different HTML contexts. In other words, when a rendered block of FBML is dropped into an HTML page, the FBML does not affect other contents of the page display. This is achieved by parsing and rewriting CSS safely and balancing all HTML tags, and thus does not require an iframe. FBML comes in "flavors," so that, for example, FBML may be rendered with no images in a particular case, or may be used to do special things like cache all referenced images on the social network provider's own servers.

In addition to providing the benefits of customized content to users of a social network, FBML also enhances the ability of the social network provider to perform various functions. For example, using FBML, the social network provider may load content dynamically in response to a user action in a way similar to that effected using "AJAX" (Asynchronous JavaScript and XML) technologies, but without requiring the social network provider to allow developers full JavaScript access, which is often very risky. This special ability afforded by FBML is called "mock AJAX." In addition, FBML includes various tags that make it easier to use certain elements that are very useful to a social network provider desiring to provide personalized content to its users (such as the friend selector, the dashboard headers, profile pictures, and other elements used by Facebook of Palo Alto, Calif.). Partly by incorporating restrictions on JavaScript and flash, FBML still allows webpages to load quickly in organized forms that are easy to navigate and have the appropriate level of privacy and security.

Figure 7:
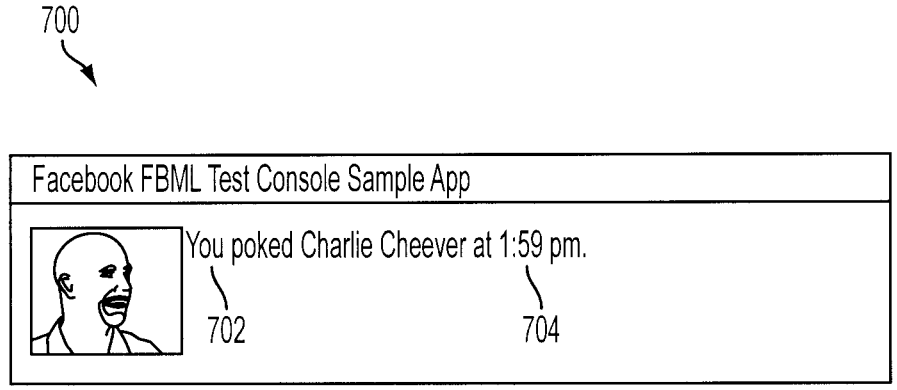
FIG. 7 is a screenshot of an exemplary display, showing one example of personalization to the user according to the present invention.

FIG. 7 is a screenshot of an exemplary display, showing one example of personalization to the user according to the present invention. This personalization was achieved using Facebook Markup Language. The FBML code shown below results in the image 700 shown in FIG. 7. The tags starting with "fb:" are specific to FBML, whereas some others (like "div") and some attributes (like "style") are also part of HTML.

```
<fb:if-can-see uid="211031"><div style="clear: both; padding: 3px;">
    <fb:profile-pic style="float: left;" uid="211031"
    size="square"/>
    <fb:name uid="211031" capitalize="true"/> poked
    <fb:name uid="1160"/>
    at <fb:time t="1179349148"/>.
</div></fb:if-can-see>
```

If, for example, the image or display 700 shown in FIG. 7 were presented to user Ari Steinberg, the display would say, "Ari Steinberg poked Charlie Cheever" in HTML. However, in FBML, the name of the user in the subject of the sentence may be replaced with the term "you" 702 when displayed to the user with the same userid as the subject (as shown here). On the other hand, if the display were presented to a user of the social network with a userid different from that in the subject of the sentence, the name "Ari Steinberg" would be shown in place of the term "you" 702. Thus, this display 700 reads, "You poked Charlie Cheever . . . ." Similarly, in FBML the time 704 may be converted into the viewer's time zone.

Installation may integrate the application into the user's social network environment at one or more integration points. At various integration points in the user's social network environment, the user may interact with the application by clicking buttons, inputting data to the application, and/or viewing data presented by the application. Possible integration points include the left navigation bar in the dashboard (or frame), provided by the social network provider, as well as various points on the user's profile (e.g., a left column, a right column, an action menu) and other windows accessible by the user.

Figure 8A:
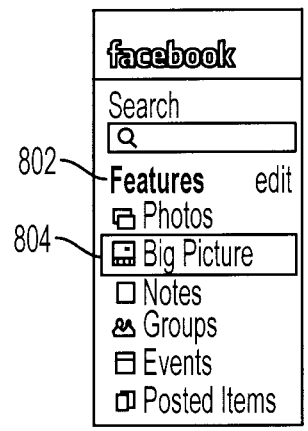
FIGS. 8A and 8B are screenshots of an exemplary navigation bar for integrating a third-party application.
Figure 8B:

FIGS. 8A and 8B are screenshots of an exemplary navigation bar 800 for integrating an exemplary third-party application. Here, the navigation bar 800 is the left navigation bar (or "left nav") in the upper left corner of a social network user's profile 400. In FIG. 8A, at the left-nav integration point 802 a button 804 linking to an exemplary third-party application ("Big Picture") is integrated with other features.

FIG. 8B shows another configuration of the navigation bar 800. Comparison of FIG. 8B with FIG. 8A demonstrates the configurability of the left-nav integration point 802, in that the button 804 for the third-party application, which is second from the top in FIG. 8A, has been shifted to the bottom of the feature list in FIG. 8B.

Figure 9:
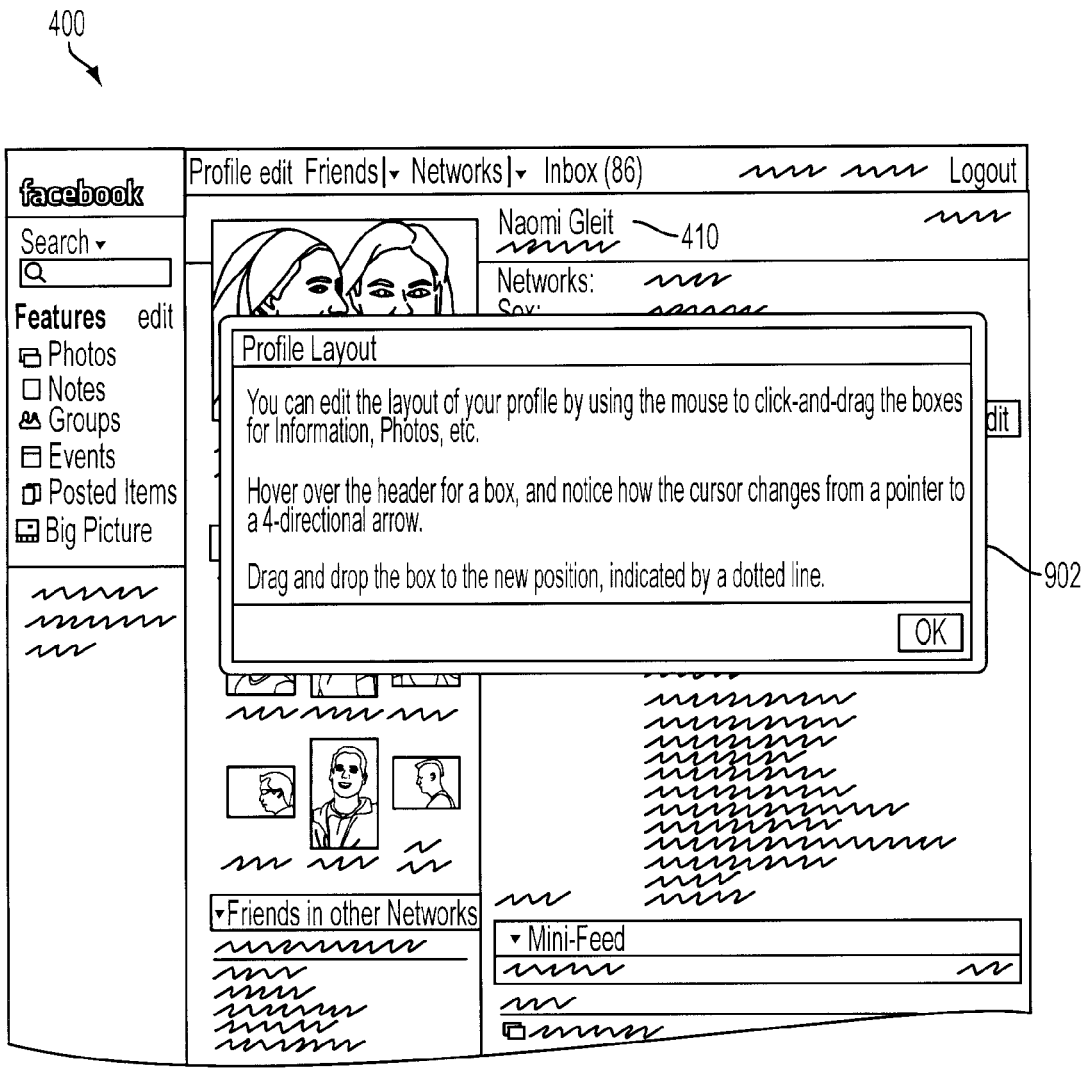
FIG. 9 is a screenshot of an exemplary popup box on a user profile containing instructions for the user.

FIG. 9 is a screenshot of an exemplary popup box 902 overlaid on a user profile 400 containing instructions for the user. Here, the box 902 explains how the layout of a user's profile 400 may be edited. In this example, a user may use the cursor to rearrange boxes in the left and right columns by dragging-and-dropping them. The contents of a box in a column may comprise space for text, images, and/or one or more interface points between the user and one or more applications.

Figure 10A:
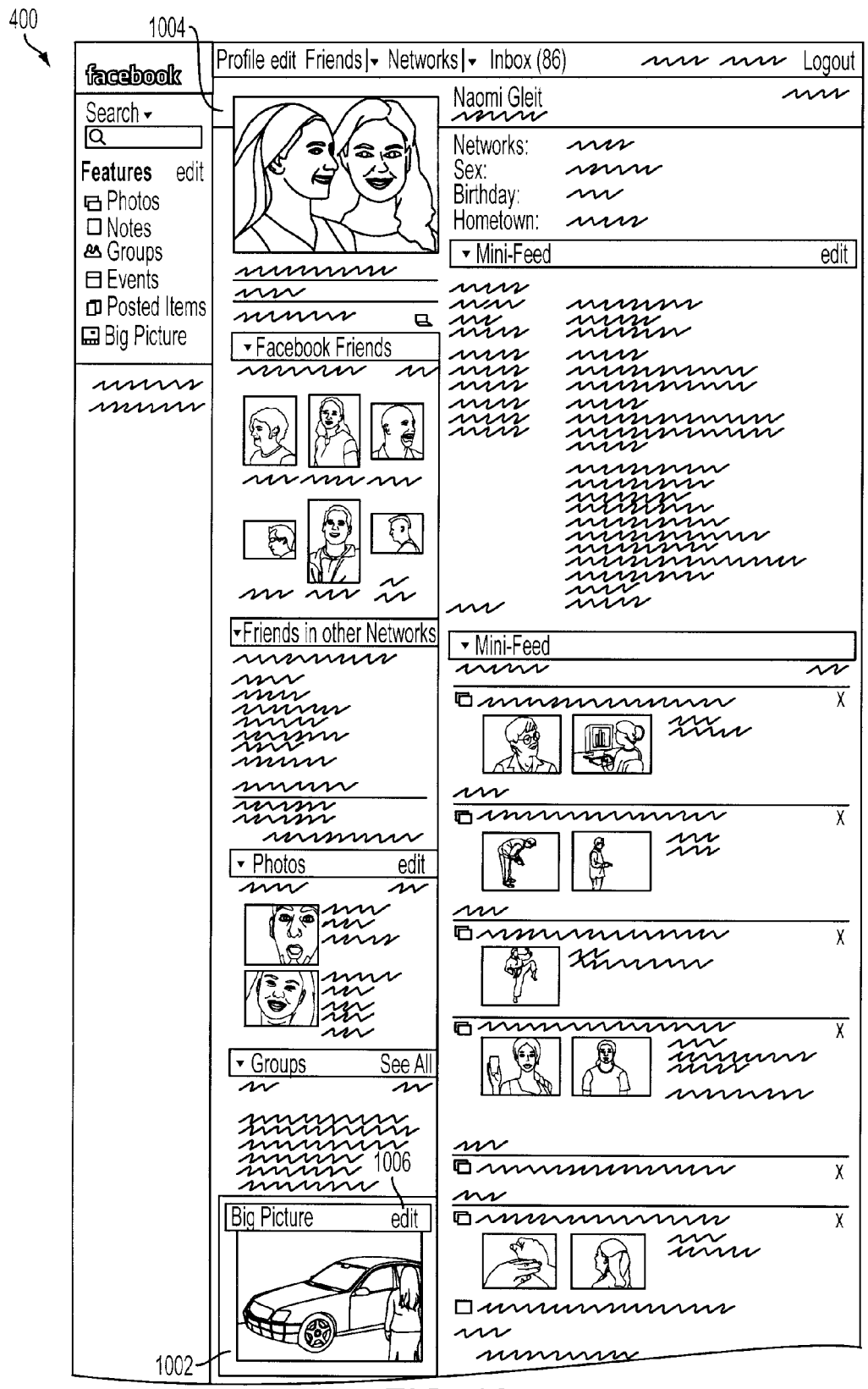
FIGS. 10A and 10B are screenshots of an exemplary user profile showing integration of a third-party application.
Figure 10B:
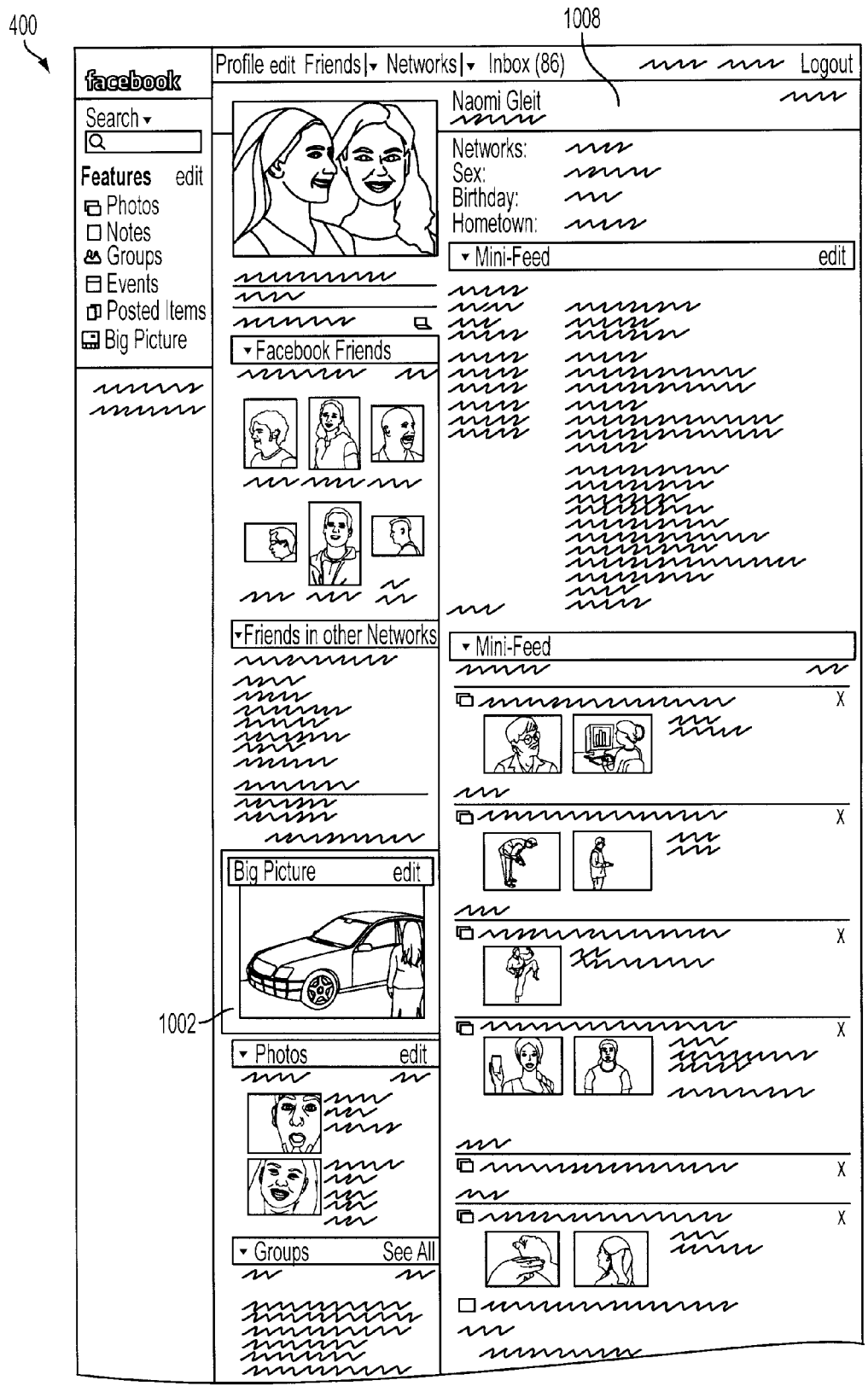

FIGS. 10A and 10B are screenshots of an exemplary user profile 400 showing integration of a third-party application. In FIG. 10A, a box 1002 in the left column 1004 of the profile 400 provides an interface to the application, "Big Picture." The box 1002 features a displayed image and an "edit" button 1006. The button 1006 allows the user to interact with the application. This is an example of left-column integration.

Figure 11:
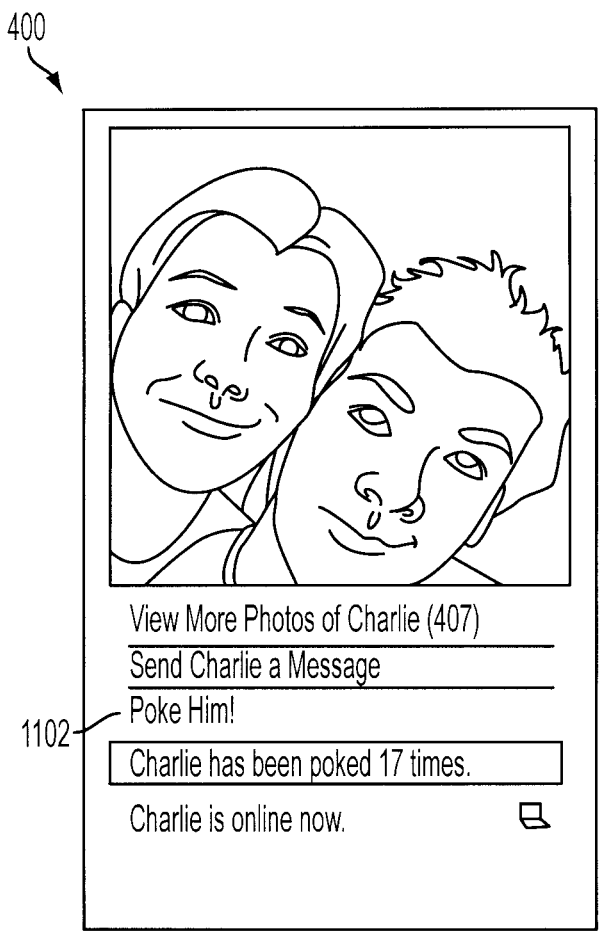
FIG. 11 is a screenshot of an exemplary action menu that may be on a user profile, including an integration point for an application.

FIG. 10B shows integration of an exemplary third-party application in an alternative location, via box 1002. Comparison of FIG. 10B with FIG. 10A demonstrates the configurability of this integration point, in that the box 1002 for the third-party application, which is at the bottom of the left column in FIG. 10A, has been shifted up within the left column in FIG. 10B. Similarly, an application may be integrated in other locations in the profile, such as various positions in the right column 1008 of the profile, or in an optional action menu. FIG. 11 is a screenshot of an exemplary action menu 1100 that may be on a user profile 400, including an integration point for an application. A user may interact with the application by clicking on a button 1102 in the action menu. Multiple integration points may also be used simultaneously.

Figure 12:
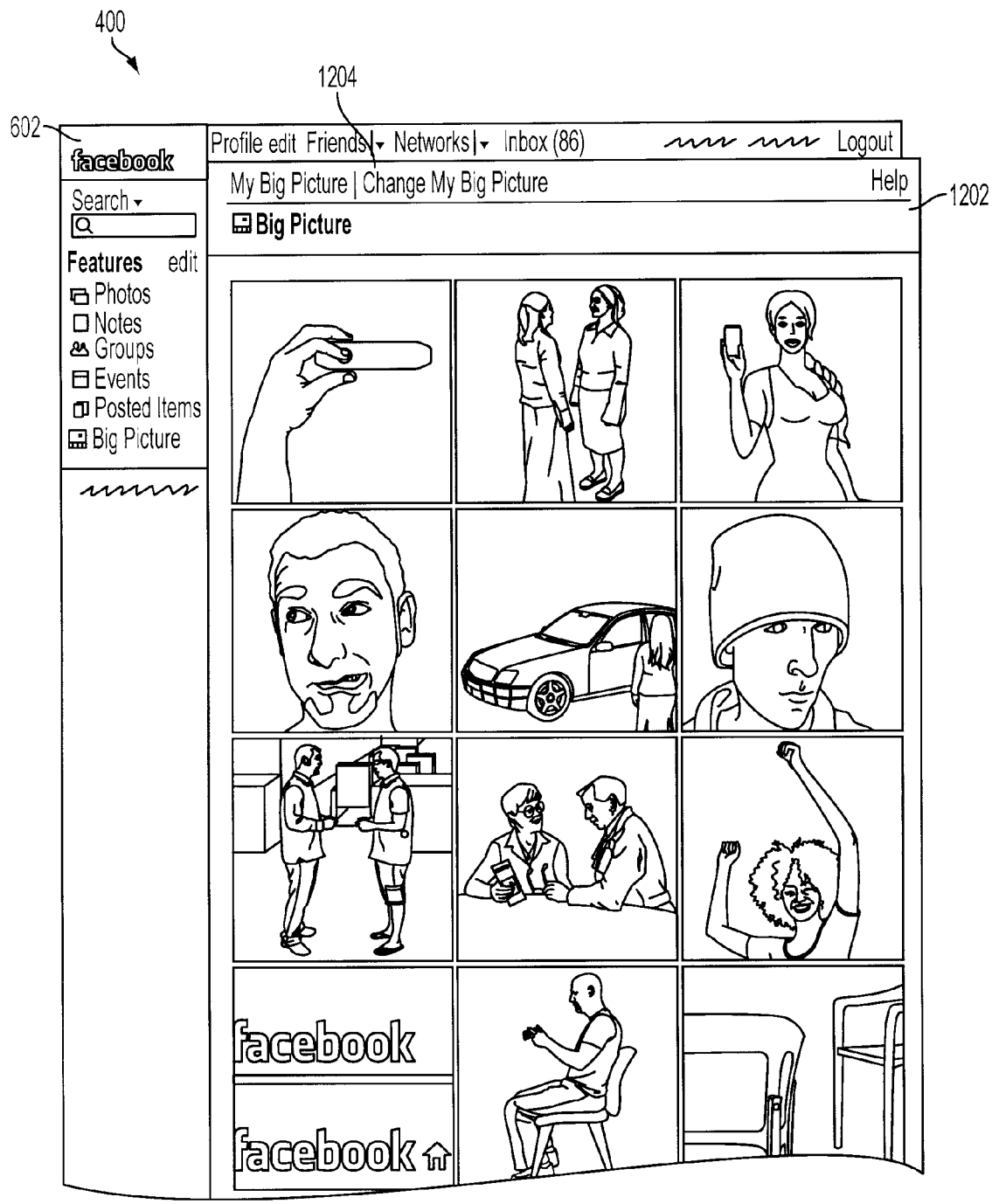
FIG. 12 is a screenshot of an exemplary interface for a third-party application.

FIG. 12 is a screenshot of an exemplary interface for a third-party application. A social network provider's dashboard 602 optionally may frame an interface 1202, as shown here. A user may arrive at a full-page interface 1202 like this one by accessing the application through an integration point. For example, the user may view his collection of images in the application (in this example, Big Picture) by clicking on the button 804 in the left nav 800 as shown in FIG. 8. The interface 1202 (in this example, with Big Picture) also may offer the user links 1204 providing further interaction with the application, such as the "Change My Big Picture" link 1204 near the top of the page in this example.

Figure 13:
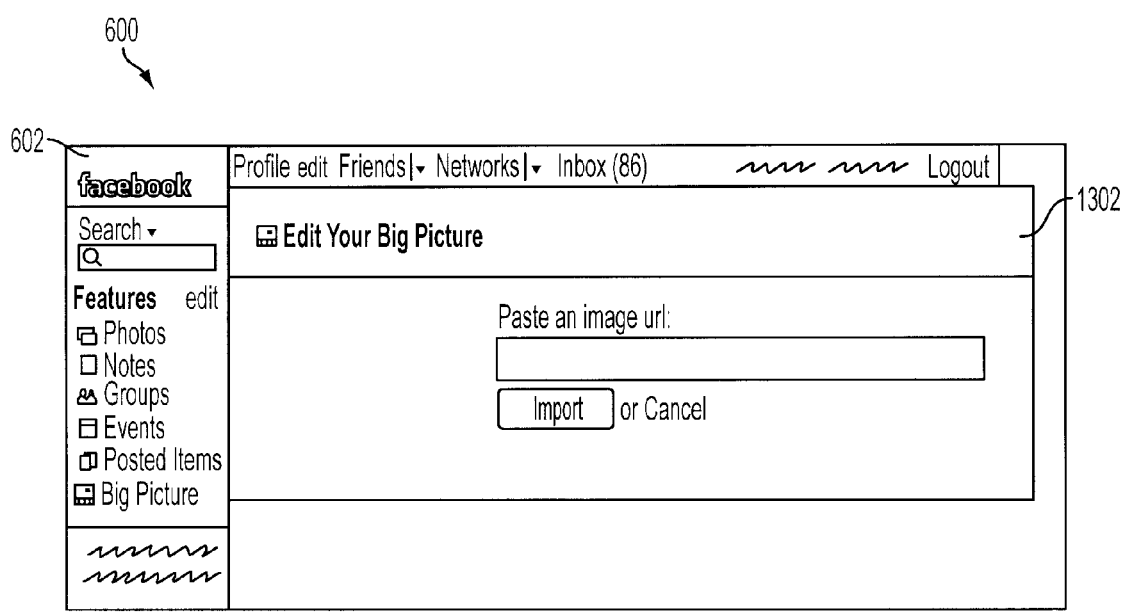
FIG. 13 is another screenshot of an exemplary interface for a third-party application.

FIG. 13 is another screenshot of an exemplary interface for a third-party application. Here again, the social network provider's dashboard 602 frames the interface. In this example, the user presented the screen shown in FIG. 12 has clicked on the "Change My Big Picture" link 1204 to arrive at the interface 1302 shown in FIG. 13. This interface 1302 with the application Big Picture allows the user to edit a page like that shown in FIG. 12, changing the image(s) displayed thereon.

Figure 14:
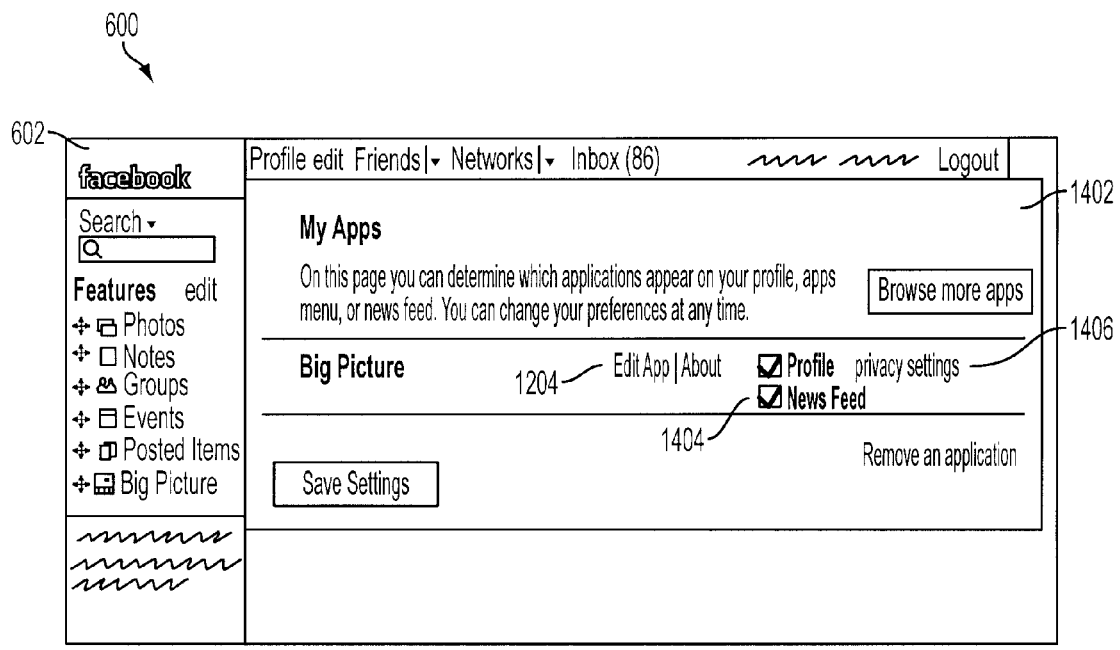
FIG. 14 is a screenshot of an exemplary interface that enables a user to determine which applications appear in various parts of the social network environment.

FIG. 14 is a screenshot of an exemplary interface that enables a user to determine which applications appear in various parts of the social network environment presented to the user. The social network provider's dashboard 602 frames a "My Apps" box 1402, which lists a third-party application (Big Picture), and provides the user with links 1204 (such as the "Edit App" link, which accesses the screen shown in FIG. 13), with a list of checkboxes for designating integration points that the user may choose for access to the application via the social network platform (such as the checkbox 1404 for the "News Feed" integration point), and with opportunities to adjust the user's "privacy settings" with respect to the application (for example, via a button 1406).

Applications can be subject to privacy settings, as described in U.S. patent application Ser. No. 11/493,291, titled "Systems and Methods for Dynamically Generating a Privacy Summary," filed on Jul. 25, 2006. Privacy settings allow the user to designate which of his information in the social network may and may not be made available to the application. Privacy settings regarding the use of his information may be set by the user, if desired, for applications installed by any user.

Figure 15:
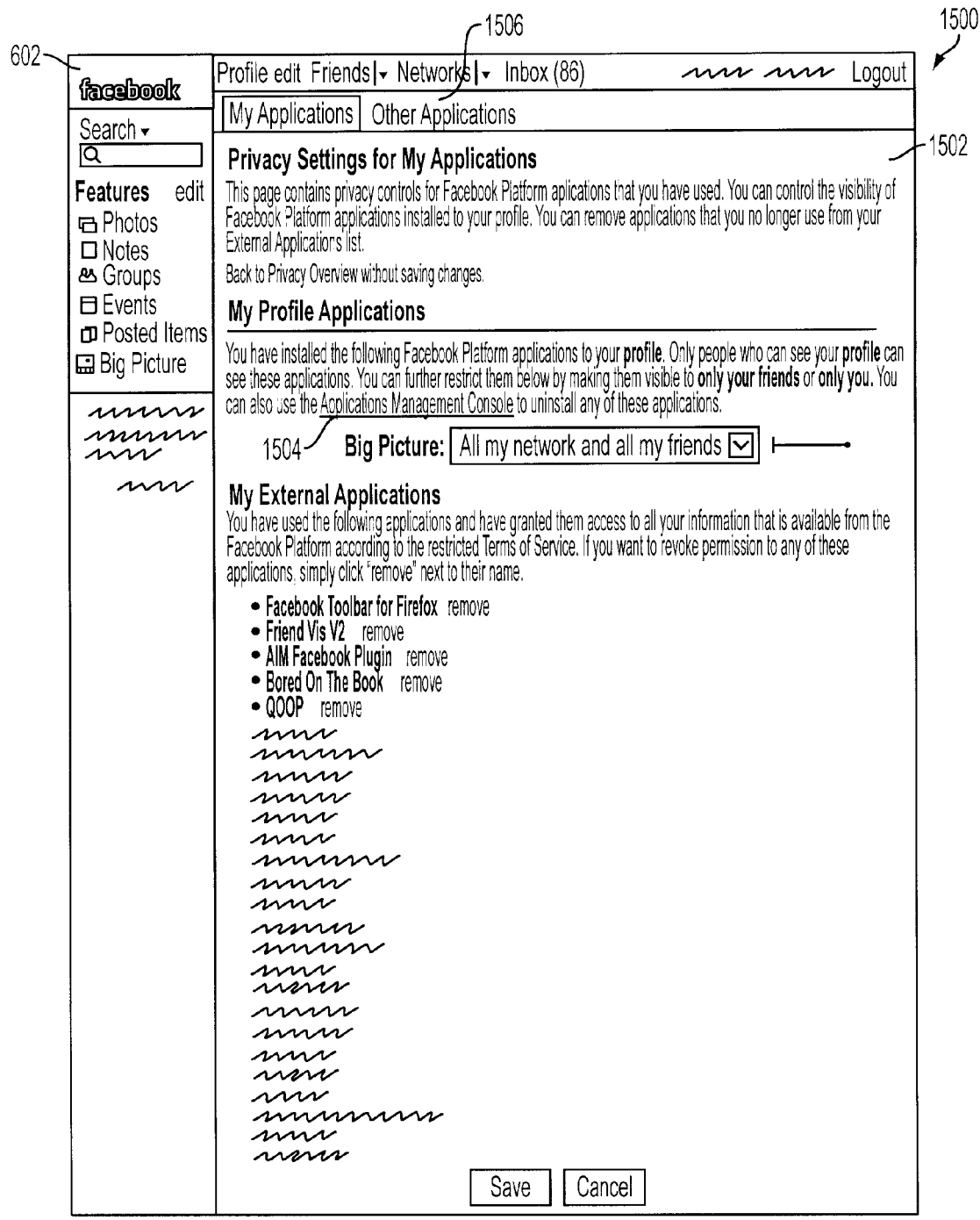
FIG. 15 is a screenshot of an exemplary display that enables a user of a social network to select privacy settings for applications that the user has accessed.

FIG. 15 is a screenshot of an exemplary display 1500 that enables a user of a social network to select privacy settings for applications that the user has accessed. Here, the user presented the screen shown in FIG. 14 has clicked on the button 1406 labeled "privacy settings" to arrive at the display shown in FIG. 15. The social network provider's dashboard 602 frames a "Privacy Settings for My Applications" box 1502, which allows the user to choose whether an application that the user has installed on his profile will be visible to his friends, or only to himself, when accessing his profile. The user can also follow a link 1504 to a screen that will enable the user to uninstall the application. Further, the user may revoke permissions given to external applications to access his information that is available through the social network provider. The user may click on a tab 1506 to select privacy settings regarding applications installed by other users.

Figure 16:
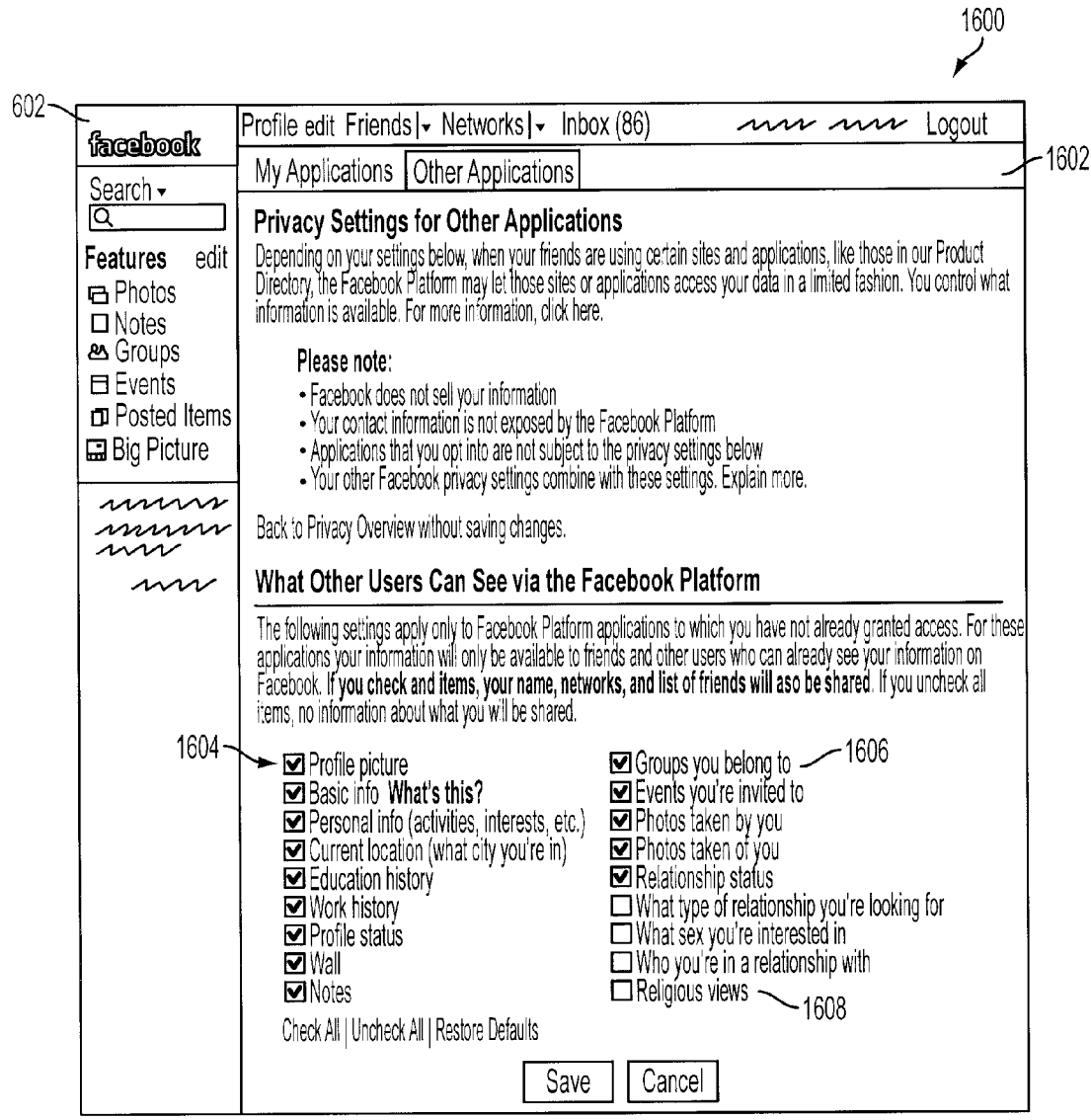
FIG. 16 is a screenshot of an exemplary display that enables a user of a social network to select privacy settings for applications that other users of the social network have accessed.

FIG. 16 is a screenshot of an exemplary display 1600 that enables a user of a social network to select privacy settings for applications that other users of the social network have accessed. This display is presented when the user has clicked on the "Other Applications" tab 1506 at the top of the box in FIG. 15. The social network provider's dashboard 602 frames a "Privacy Settings for Other Applications" box 1602, which allows the user to designate which of his information on the social network may be accessible to applications installed by other users of the social network.

For example, if another user has installed the application, "My Favorite Restaurants," but user 102A, for example, has not, user 102A can use the presented checkboxes 1604 to indicate which of his or her information the My Favorite Restaurants application may access, such as "Groups you belong to" 1606 (checked: set to allow access) and "Religious views" 1608 (not checked: set to prevent access). In this example, the display explains that if the user checks any of the checkboxes 1604, the user also will be allowing the application to access his name, networks, and lists of friends.

Figure 17:
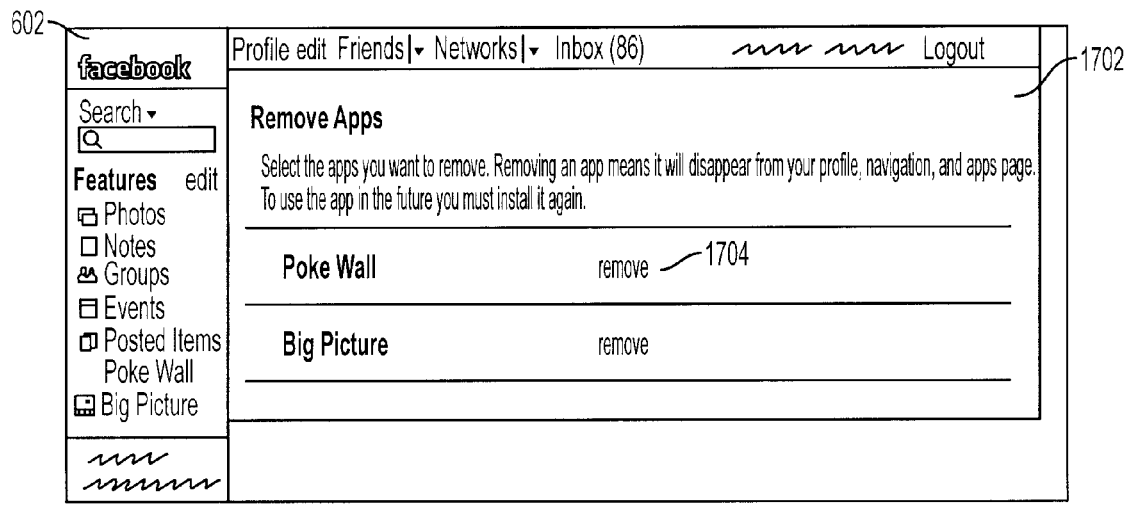
FIG. 17 is a screenshot of an exemplary interface that enables a user of the social network to uninstall applications.

FIG. 17 is a screenshot of an exemplary interface that enables a user of the social network to uninstall applications. The social network provider's dashboard 602 frames a "Remove Apps" box 1702, explaining and offering one or more opportunities for uninstallation via buttons 1704. A user's uninstalling or removing an application results in the application's disappearance from its integration points in the user's social network environment. The user may install the application at a later date if desired.

Figure 18:
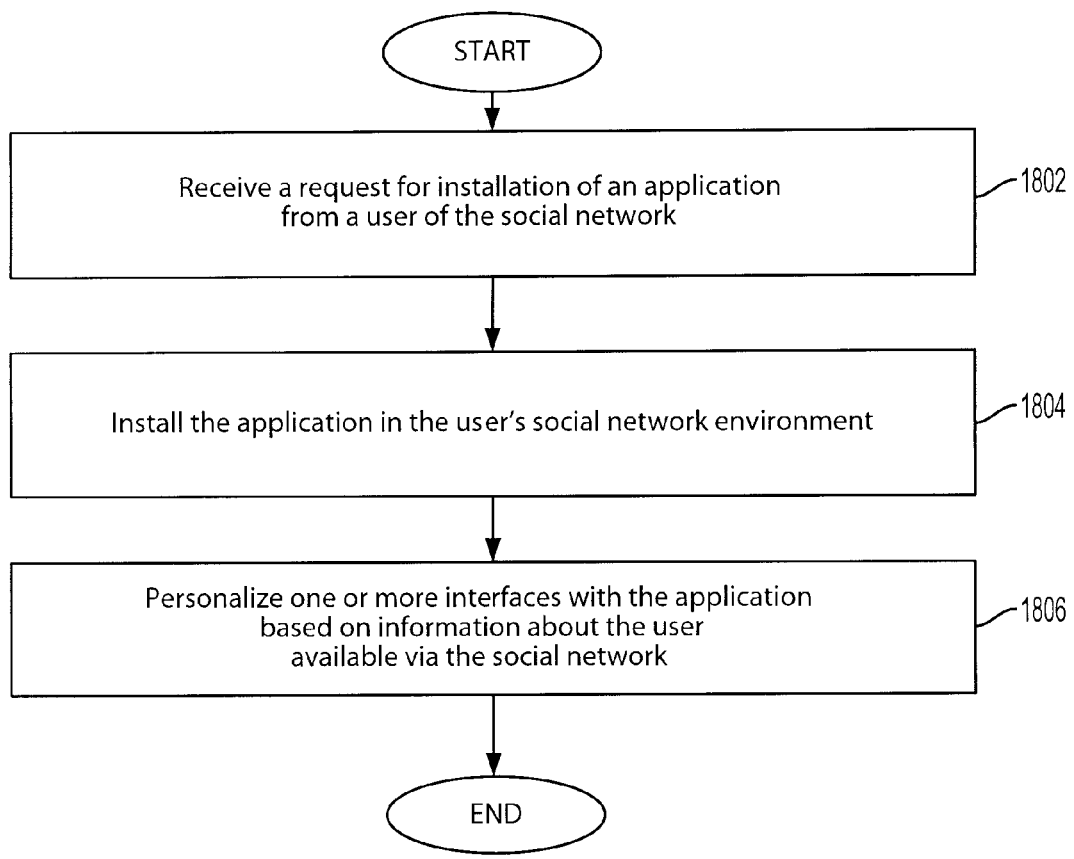
FIG. 18 is a flow chart showing an exemplary process for providing a personalized platform for accessing internet applications.

FIG. 18 is a flow chart showing an exemplary process for providing a personalized platform for accessing internet applications. At step 1802, a request is received from a user of the social network for installation of an application in that user's social network environment. The request may be for an application developed by the social network provider, or for an application developed by a third party. Any kind of application, for example, those that display still or moving images, those that play sounds such as music or speech, those for financial management, or any purpose is within the scope of the invention.

At step 1804, the application is installed in the user's social network environment. As discussed herein, the application may be integrated at one or more points in the user's environment. The integration points may be configurable by the user.

At step 1806, one or more interfaces with the application are personalized based on information about the user that is available from or through the social network. The interfaces may include content that is personalized for the user based on information such as information in the user profile database 206, privacy settings selected by the user, and groupings of the user with other users of the social network, for example.

While various embodiments have been described above, it should be understood that they have been presented by way of example only, and not limitation. Thus, the breadth and scope of a preferred embodiment should not be limited by any of the above-described exemplary embodiments.

What is claimed is:

1. A method comprising:
   receiving, within a platform hosted by a social network provider, a request to associate an application with a profile of a user of the social network provider, the application provided by a third-party server external to the social network provider and maintained on a computing device that is separate from a device of the user;
   associating the application with the profile of the user in the social network provider;
   receiving, by the social network provider, a request from the application to access information about the user;
   transmitting the requested information about the user from the social network provider to the application;
   receiving application content from the application, the received application content comprising at least some of the information about the user transmitted by the social network provider to the application; and
   providing the application content from the social network provider for display to the user such that the user can interact directly with the application within the platform.

2. The method of claim 1, further comprising supplementing the application content by loading content in response to a user action.

3. The method of claim 2, wherein loading content further comprises using a markup language that does not allow full JavaScript access to the social network provider.

4. The method of claim 1, wherein the transmitted information about the user and the received application content further comprises information about one or more other users of the social network provider who have established a connection to the user through the social network provider.

5. The method of claim 4, further comprising:
   receiving privacy settings from the other user that determine whether the other user's information is available for supplementing the application content.

6. The method of claim 1, further comprising: presenting the application to the user within the social network provider.

7. A system comprising:
   a processor;
   a non-transitory computer readable medium for storing software modules;
   a communications interface, configured to receive, within a platform hosted by a social network provider, a request from a user of the social network provider to associate an application with a profile of a user of the social network provider, the application provided by a third-party server external to the social network provider and maintained on a computing device that is separate from a device of the user;
   a user information database, coupled to the communications interface, configured to store and update information associated with the user; and
   an application integration module configured to:
      associate an application with the profile of the user in the social network provider in response to a request from the user,
      receive a request from the application to access information about the user, transmit the requested information about the user to the application,
      receive application content from the application, the received application content comprising at least some of the information about the user transmitted by the social network provider to the application, and
      provide the application content from the social network provider for display to the user such that the user can interact directly with the application within the platform.

8. The system of claim 7, further comprising a privacy settings selections component, in communication with the user information database, configured to receive privacy settings from the user that determine whether the user's information is available for supplementing application content for one or more other users.

9. The system of claim 8, wherein the privacy settings selections component is further configured to receive privacy settings from the other user that determine whether the other user's information is available for supplementing.

10. The system of claim 7, further comprising:
    a display engine configured to display one or more interfaces with the application to the user within an interface of the social network provider.

11. The system of claim 7, wherein the application integration module is further configured to transmit, information about one or more other users of the social network provider who have established a connection to the user through the social network provider, where the received application content comprises the information about one or more other users of the social network provider who have established a connection to the user through the social network provider.

12. The system of claim 11, wherein the information associated with the user is displayed based on one or more privacy settings selected by the user.

13. The system of claim 7, wherein the application integration module supplements the application content by processing a markup language.

14. The system of claim 13, wherein the markup language does not allow full JavaScript access to the social network provider.

15. The system of claim 7, wherein the application integration module is further configured to install interfaces to the application at one or more integration points in the user's social network provider.

16. A computer program embodied on a non-transitory computer readable medium having instructions for performing steps comprising:
- receiving, within a social network provider, a request to associate an application with a profile of a user of the social network provider, the application provided by a third-party server external to the social network provider and maintained on a computing device that is separate from a device of the user;
- associating the application with the profile of the user in the social network provider;
- receiving, by the social network provider, a request from the application to access information about the user;
- transmitting the requested information about the user from the social network provider to the application;
- receiving application content from the application, the received application content comprising at least some of the information about the user transmitted by the social network provider to the application; and
- providing the application content from the social network provider for display to the user such that the user can interact directly with the application within the platform.

17. The computer program of claim 16, further comprising supplementing the application content by loading content in response to a user action.

18. The computer program of claim 17, wherein loading content further comprises using a markup language that does not allow full JavaScript access to the social network provider.

19. The computer program of claim 16, wherein the transmitted information about the user and the received application content further comprises information about one or more other users of the social network provider who have established a connection to the user through the social network provider.

20. The computer program of claim 19, wherein the computer readable medium further has instructions for:
- receiving privacy settings from the other user that determine whether the other user's information is available for supplementing the application content.

21. The computer program of claim 16, wherein the computer readable medium further has instructions for:
- presenting the application to the user within the social network provider.

* * * * *